(12) United States Patent
Cheng et al.

(10) Patent No.: US 8,014,144 B2
(45) Date of Patent: Sep. 6, 2011

(54) SERVER DEVICE WITH A STORAGE ARRAY MODULE

(75) Inventors: Tsai-Kuei Cheng, Taipei (TW); Yong-Liang Hu, Shanghai (CN); Ji-Peng Xu, Shanghai (CN); Shi-Feng Wang, Shanghai (CN); Shyn-Ren Chen, Taipei (TW); Chia-Nan Chien, Taipei (TW); Banks Chen, Taipei (TW); Ting Song, Shanghai (CN); Ling-Yi Zhang, Shanghai (CN)

(73) Assignee: Inventec Corporation, Taipei (TW)

( * ) Notice: Subject to any disclaimer, the term of this patent is extended or adjusted under 35 U.S.C. 154(b) by 184 days.

(21) Appl. No.: 12/542,725

(22) Filed: Aug. 18, 2009

(65) Prior Publication Data
US 2011/0043994 A1 Feb. 24, 2011

(51) Int. Cl.
*G06F 1/16* (2006.01)
(52) U.S. Cl. ................................. 361/679.33
(58) Field of Classification Search .............. 361/679.33
See application file for complete search history.

(56) References Cited

U.S. PATENT DOCUMENTS

| | | | |
|---|---|---|---|
| 5,579,204 A * | 11/1996 | Nelson et al. | 361/679.32 |
| 5,877,938 A * | 3/1999 | Hobbs et al. | 361/724 |
| 6,088,224 A * | 7/2000 | Gallagher et al. | 361/695 |
| 6,392,884 B1 * | 5/2002 | Chou | 361/679.33 |
| 6,459,571 B1 * | 10/2002 | Carteau | 361/679.33 |
| 6,816,368 B2 * | 11/2004 | Yokosawa | 361/679.33 |
| 6,862,173 B1 * | 3/2005 | Konshak et al. | 361/679.33 |
| 6,950,304 B2 * | 9/2005 | Suzuki et al. | 361/679.33 |
| 7,042,720 B1 * | 5/2006 | Konshak et al. | 361/679.33 |
| 7,362,565 B2 * | 4/2008 | Imblum | 361/679.33 |
| 7,466,543 B2 * | 12/2008 | Wang | 361/679.33 |
| 7,710,718 B2 * | 5/2010 | Merkin et al. | 361/679.33 |
| 7,719,834 B2 * | 5/2010 | Miyamoto et al. | 361/695 |
| 7,864,519 B2 * | 1/2011 | Lin et al. | 361/679.33 |
| 7,889,490 B2 * | 2/2011 | Chen et al. | 361/679.33 |
| 2002/0089823 A1 * | 7/2002 | Chin | 361/687 |
| 2003/0147220 A1 * | 8/2003 | Fairchild | 361/726 |
| 2008/0037209 A1 * | 2/2008 | Niazi et al. | 361/683 |
| 2009/0109609 A1 * | 4/2009 | Lai et al. | 361/679.39 |
| 2010/0033917 A1 * | 2/2010 | Du et al. | 361/679.32 |
| 2010/0118483 A1 * | 5/2010 | Kurokawa et al. | 361/679.33 |
| 2010/0259884 A1 * | 10/2010 | Wang et al. | 361/679.33 |
| 2010/0265645 A1 * | 10/2010 | Wang et al. | 361/679.4 |

* cited by examiner

*Primary Examiner* — Lisa Lea Edmonds
(74) *Attorney, Agent, or Firm* — CKC & Partners Co., Ltd.

(57) ABSTRACT

A server device with a storage array module is provided. The server device includes a chassis, a motherboard module, and a storage array module. The motherboard module and the storage array module are disposed in the chassis. The storage array module includes a first tray removably disposed in the chassis, a hard disk back panel fixed to a bottom of the first tray, and several hard disks hot-pluggably disposed in the first tray. The hard disk back panel is electrically connected to the motherboard module, and the hard disks are electrically connected to the hard disk back panel and driven to move into/out the chassis with the first tray.

14 Claims, 6 Drawing Sheets

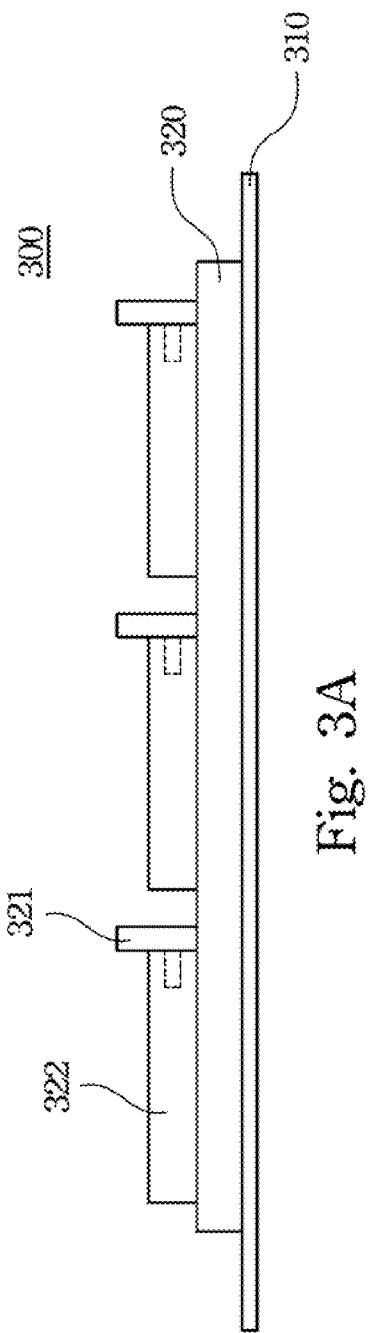
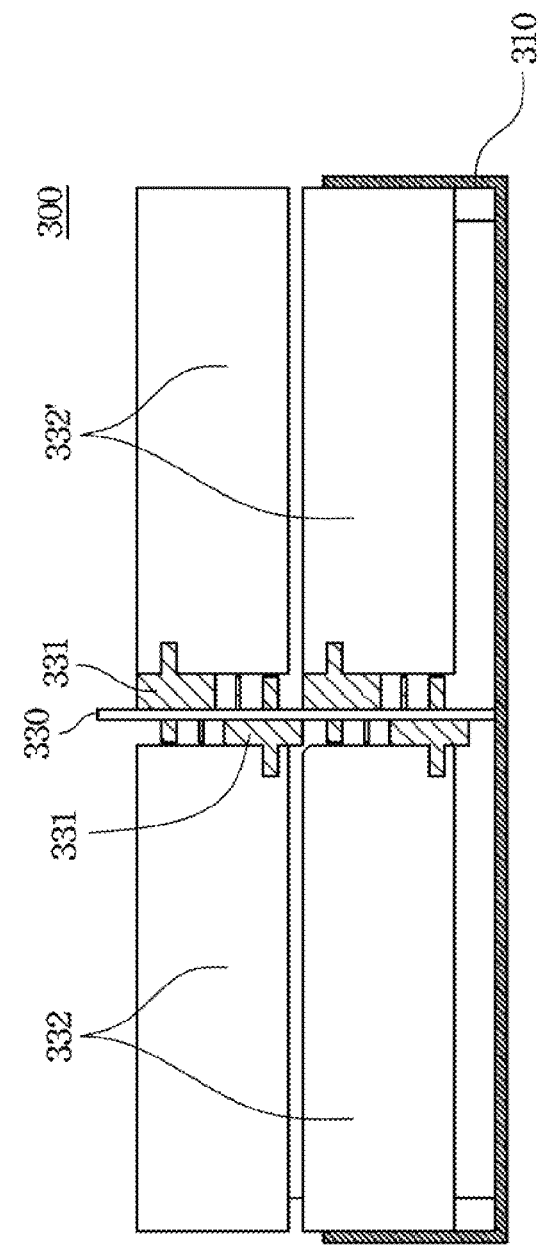

SERVER DEVICE WITH A STORAGE ARRAY MODULE

FIELD OF THE INVENTION

The present invention relates to a server device, and more particularly to a server device with double rack units.

BACKGROUND OF THE INVENTION

A rack unit is an Electronic Industries Alliance (EIA) measuring unit used to describe the height of a server. One rack unit is more commonly written as "1U"; similarly, two rack units are "2U" and so on. One rack unit is 1.75 inches (about 44.45 mm) high and 19 inches width, two rack units is 1.75*2 inches (about 89 mm) high and 19 inches width and so on. Therefore, according to the rule, in a server with N rack units, no matter how components are arranged within the server, the components must fit the height in a designated specification.

The space availability of a chassis of a 2U server available in the market is increased; however, the 2U server does not have expansibility. Typically, the chassis of the 2U server includes several motherboards, a power supply and signal lines therein, wherein the power supply is used to provide power for hosts, and the signal lines are used to electrically connect devices in the hosts. Each motherboard further includes a hard disk carrier, wherein several hard disks are disposed in the hard disk carrier. However, the chassis of the typical 2U server host only can contain several hosts due to the limitation of the line distribution of the signal lines, so that the space of the chassis cannot be effectively used for the expansion of other function modules, thereby preventing the work efficiency of the server from being further improved.

SUMMARY OF THE INVENTION

Accordingly, one aspect of the present invention is to disclose a server device with a storage array module, which can increase the changing mobility of the module by providing a removable storage array module.

Another aspect of the present invention is to disclose a server device with a storage array module, which is used to connect more hard disks to increase the data storage performance of the server device.

According to the aforementioned aspects, the server device with a storage array module includes a chassis, at least one motherboard module and at least one storage array module. The motherboard module is disposed in the chassis. The storage array module is disposed in the chassis and includes a first tray, a hard disk back panel and several hard disks. The first tray is removably disposed in the chassis. The hard disk back panel is fixed to a bottom of the first tray and is electrically connected to the motherboard module. The hard disks are hot-pluggably disposed in the first tray and are electrically connected to the hard disk back panel in the first tray.

According to one embodiment of the present invention, the hard disk back panel horizontally adhered to the bottom of the first tray. The hard disk back panel includes several first hard disk interfaces spaced at intervals on one surface of the hard disk back panel and all facing the same direction. The hard disks are horizontally disposed on the hard disk back panel and are electrically connected to the first hard disk interfaces one on one.

In another embodiment of the present invention, the hard disk back panel is erected on the first tray; the hard disk back panel includes a plurality of second hard disk interfaces staggered and disposed on two opposite surfaces of the hard disk back panel and electrically connected to the hard disks one on one. The hard disks are aligned and disposed on the two opposite surfaces of the hard disk back panel, and the hard disks are set in a reverse direction of 180 degrees. In addition, in the present embodiment, the second hard disks disposed on each of the surfaces of the hard disk back panel are arranged in an array including at least two rows.

In another embodiment of the present invention, the motherboard module includes a second tray and a motherboard. The second tray is removably disposed in the chassis. The motherboard is disposed on the second tray.

In another embodiment of the present invention, the chassis includes a first opening and a second opening on two opposite ends, and the first opening is defined to include an upper region and a lower region. The motherboard module is removably disposed in the lower region, and the storage array module is removably disposed in the upper region.

In another embodiment of the present invention, the server device further includes at least one input/output interface circuit board module, wherein the input/output interface circuit board module is removably disposed in the second opening and is electrically connected to one motherboard module and one storage array module to provide the separable motherboard module and input/output interface circuit board module. Therefore, when the motherboard module is drawn out, it is unnecessary to remove all of the external wires of the input/output interface circuit board module.

Another aspect of the present invention is to disclose a server device with a storage array module, by which when the storage array module is drawn out from the first opening, the storage array module still can be electrically connected to the corresponding input/output interface circuit board module.

An extendable/foldable supporting arm is disposed between the chassis and the storage array module. The supporting arm is composed of a plurality of link rods, wherein the link rods are arranged in a series connection method and are pivotably connected in sequence. Two ends of the supporting arm are pivotly connected to the chassis and the storage array module respectively. In addition, the supporting arm is further set with a wire set. One end of the wire set is electrically connected to the hard disk back panel of the storage array module, and the other end of the wire set is at least electrically connected to the input/output interface circuit board module.

Furthermore, the first tray, the second tray or the third tray includes a handle structure, which can be shut/turned, for the user to push or pull the corresponding tray.

According to the aforementioned description, the server device with a storage array module of the present invention includes more rooms for more application modules and the related devices to enhance the performance of the server unit. When the user operates the server device, the designs of the above-mentioned embodiments can increase the use convenience, fulfill the requirement and increase the market competitiveness.

BRIEF DESCRIPTION OF THE DRAWINGS

The foregoing aspects and many of the attendant advantages of this invention are more readily appreciated as the same become better understood by reference to the following detailed description, when taken in conjunction with the accompanying drawings, wherein:

FIG. 3A illustrates a lateral view of a storage array module of a server device with a storage array module in accordance with a first modification in one embodiment of the present invention taken along a direction from a center partition vertical panel toward the storage array module;

FIG. 3B illustrates a lateral view of a storage array module of a server device with a storage array module in accordance with a second modification in one embodiment of the present invention taken along a direction from a first opening toward the storage array module;

DETAILED DESCRIPTION OF THE PREFERRED EMBODIMENT

The spirit of the present invention is clearly illustrated by reference to the following detailed description, when taken in conjunction with the accompanying drawings. Various changes and modifications can be made by a person skilled in the art according to the techniques taught by the present invention without departing from the spirit and scope of the present invention after appreciating the embodiments of the present invention.

The present invention discloses a server device with a storage array module, which is suitable to be disposed in a large apparatus (not shown). Many server devices can be disposed in the large apparatus. The server device includes at least one motherboard module and at least one storage array module. The storage array module includes a hard disk back panel and a plurality of hard disks disposed on the hard disk back panel. The hard disk back panel is electrically connected to the motherboard module and the hard disks.

Figure 1:
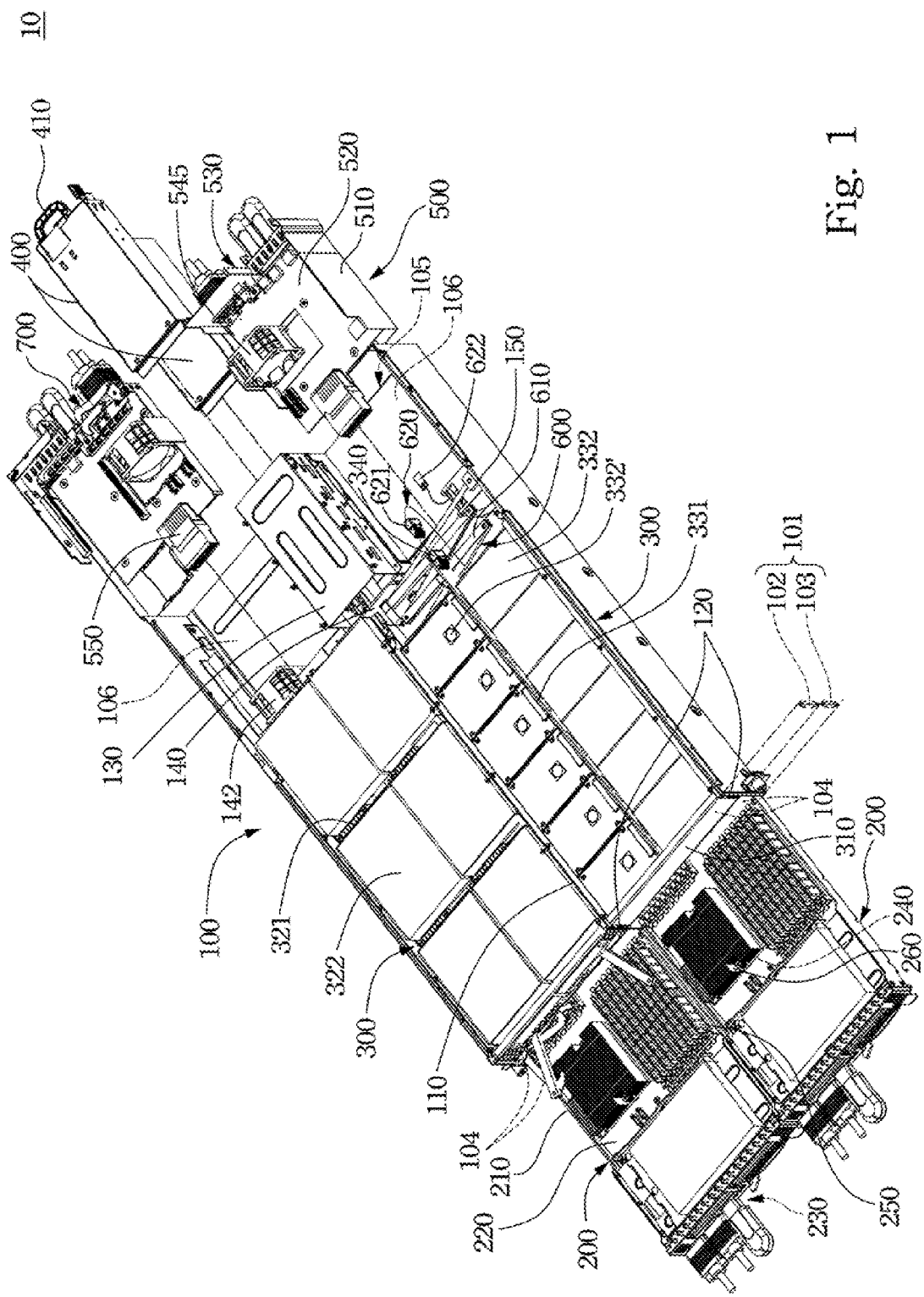
FIG. 1 is a three-dimensional drawing of a server device with a storage array module in accordance with one embodiment of the present invention.

Refer to FIG. 1. FIG. 1 is a three-dimensional drawing of a server device with a storage array module in accordance with one embodiment of the present invention. In one embodiment of the present invention, a server device 10 includes a chassis 100 containing at least two motherboard modules 200, storage array modules 300, power modules 400 and at least two input/output interface circuit board modules 500.

The motherboard modules 200 and the storage array modules 300 are removably disposed on the same end of the chassis 100, and the storage array modules 300 are abreast disposed right above the motherboard modules 200. The power modules 400 and the input/output interface circuit board modules 500 are removably disposed on the other end of the chassis 100, the power modules 400 are stacked with each other and are located between the input/output interface circuit board modules 500. Only one single power module 400 can provide power for the motherboard modules 200, the storage array modules 300 and the input/output interface circuit board modules 500, and the other power modules 400 are emergency power supplies.

The width of the chassis 100 is about 19 inches, the height (thickness) of the chassis 100 is about 2*1.75 inches, and the cross-section of the chassis 100 against the width direction is U-shaped or mouth-shaped. The chassis 100 includes a first opening 101 and a second opening 105 communicating with each other and respectively located on two opposite sides of the chassis 100. The first opening 101 can be divided into an upper region 102 and a lower region 103 against the height (thickness) direction of the chassis 100. A center partition vertical panel 110 is erected in the first opening 101 against the width direction of the chassis 100. Each of the upper region 102 and the lower region 103 is set with two removable tracks 120, wherein the removable tracks 120 are respectively disposed on the center partition vertical panel 110 and an inner sidewall of the chassis 100 and are opposite to each other. The two opposite removable tracks 120 can support a tray, and the tray can be relatively moved on the removable tracks 120.

Therefore, four trays can be disposed on two opposite sides of the center partition vertical panel 110 in the upper region 102 and the lower region 103, i.e. four first rooms are formed in the upper region 102 and the lower region 103.

In the chassis 100, a carrier 130 is erected in the second opening 105 and in the center region of the width of the chassis 100, and the second opening 105 is divided into two second rooms 106 by the carrier 130. Similarly, each of the carrier 130 and an inner sidewall of the chassis 100 can be set with a removable tracks 120, which can support the tray. Therefore, two trays can be disposed on the carrier 130 in the chassis 100.

The cross-section of the carrier 130 against the width direction of the chassis 100 is U-shaped or mouth-shaped, and two communicating openings are on two sides of the carrier 130 (as shown in FIG. 1). The power modules 400 are stacked with each other in the carrier 130. One end of each power module 400 includes a draw handle 410 exposed on a side of the carrier 130 to facilitate drawing the power module 400 from the carrier 130 and plugging the power module 400 into the carrier 130.

The chassis 100 further includes a power vertical panel 140 erected on a bottom surface of the chassis 100 and between the carrier 130 and center partition vertical panel 110. Two opposite surfaces of the power vertical panel 140 both include a plurality of connectors (as shown in FIG. 1). When the power modules 400 are disposed in the carrier 130, the power modules 400 are electrically plugged into the connectors on a side of the power vertical panel 140.

Figure 2:
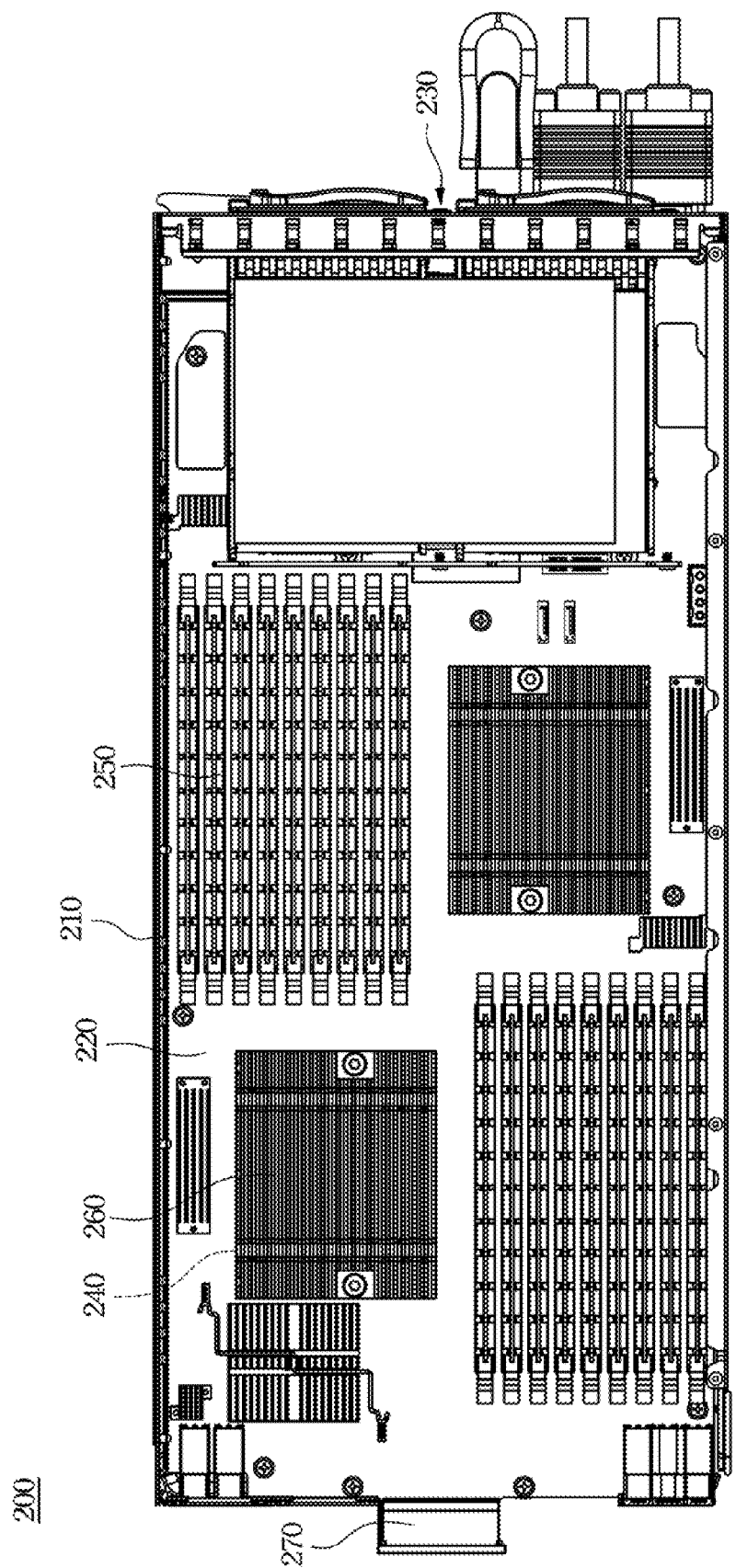
FIG. 2 illustrates a vertical view of a motherboard module of a server device with a storage array module in accordance with one embodiment of the present invention.

Refer to FIG. 2. FIG. 2 illustrates a vertical view of a motherboard module in accordance with one embodiment of the present invention. In the embodiment, the motherboard modules 200 are disposed in the two first rooms 104 in the lower region 103 one on one. The motherboard module 200 includes a second tray 210, a motherboard 220, a connector interface 230, a plurality of semiconductor chips 240, a plurality of memories 250 and a plurality of heat sinks 260. The second tray 210 is set in one first room 104 in the lower region 103, and the second tray 210 can be removably drawn out or plugged into the first opening 101 by moving the tracks 120. The motherboard 220 is horizontally placed on the second tray 210. The connector interface 230 is disposed on an end of the motherboard 220 and is exposed by the first opening 101 (as shown in FIG. 1) for being plugged in by various removable connectors. The semiconductor chips 240, the heat sinks 260 and the memories 250 are disposed on a surface of the motherboard 220. The motherboard 220 may be electrically connected to the storage array module 300 via a signal wire (not shown) directly, or via the input/output interface circuit board module 500.

In order to fit the width (about 19 inches) of the chassis 100, the motherboard 220 is narrowed to half of the normal specification to make two parallel motherboards 220 be contained in the specification of the server device 10 of the present invention. In addition, when the motherboard module 200 is individually used, the motherboard 220 may include hard disks.

In the present embodiment, the storage array modules 300 are disposed in two first rooms 104 in the upper region 102 one on one, and each storage array module 300 may be electrically connected to the motherboard 220 of the corresponding motherboard module 200 via a wire (not shown).

Refer to FIG. 3A and FIG. 3B. FIG. 3A illustrates a lateral view of a storage array module of a server device with a storage array module in accordance with a first modification in one embodiment of the present invention taken along a direction from a center partition vertical panel 110 toward the storage array module 300. FIG. 3B illustrates a lateral view of a storage array module of a server device with a storage array module in accordance with a second modification in one embodiment of the present invention taken along a direction from a first opening 101 toward the storage array module 300. When referring to FIGS. 3A and 3B, FIG. 1 can be provided for reference.

Refer to FIG. 1 and FIG. 3A. FIG. 3A illustrates a lateral view of a storage array module of a server device with a storage array module in accordance with a first modification in one embodiment of the present invention taken along a direction from a center partition vertical panel 110 toward the storage array module 300. In the first modification of the present embodiment, the storage array module 300 includes a first tray 310, a hard disk back panel 320 and a plurality of first hard disks 322. The first tray 310 is set in one first room 104 in the upper region 102, and the first tray 310 can be removably drawn out or plugged into the first opening 101 by moving the tracks 120. The hard disk back panel 320 is horizontally disposed on the first tray 310, a back surface of the hard disk back panel 320 relative to a surface of the first tray 310 is set with a plurality of first hard disk interfaces 321 spaced at intervals and all facing the same direction, for example, the first hard disk interfaces 321 in the chassis 100 all face the direction toward the outer of the first opening 101 (as shown in FIG. 1) for the access of the first hard disks 322. The first hard disks 322 (the present embodiment may have 4-6 first hard disks 322) are horizontally disposed on the hard disk panel 320, are arranged in an array (such as 2×2 or 2×3) and are electrically connected to the first hard disk interfaces 321 one on one, wherein the specification of the first hard disks 322 is 3.5 inches.

In addition, the first hard disk interfaces 321 may be disposed on a circuit vertical panel (not shown) inserted in the hard disk back panel 320. The circuit vertical panel uses a gold finger connector to electrically connect another gold finger connector on the hard disk back panel 320.

Refer to FIG. 1 and FIG. 3B. FIG. 3B illustrates a lateral view of a storage array module of a server device with a storage array module in accordance with a second modification in one embodiment of the present invention taken along a direction from a first opening 101 toward the storage array module 300. In the second modification of the present embodiment, the storage array module 300 includes a first tray 310, a hard disk back panel 330 and a plurality of second hard disks 332 and 332'. The first tray 310 is set in one first room 104 in the upper region 102, and the first tray 310 can be removably drawn out or plugged into the first opening 101 by moving the tracks 120. The hard disk back panel 330 may be a vertical panel erected on the first tray 310, and a side surface on one long side of the hard disk back panel 330 is adhered to the first tray 310. The second hard disks 332 and 332' are removably disposed on two opposite surfaces of the hard disk back panel 330, and the second hard disks 332 are aligned with the second hard disks 332', wherein the specification of the second hard disks 332 and 332' is 3.5 inches.

When the hard disk back panel 330 is erected on the first tray 310, a plurality of second hard disk interfaces 331 are staggered and disposed on the two opposite surfaces of the hard disk back panel 330. In details, the second hard disk interfaces 331 disposed on one surface of the hard disk back panel 330 pass through the hard disk back panel 330 to protrude from the corresponding position on the other surface. Similarly, the second hard disk interfaces 331 disposed on the other surface of the hard disk back panel 330 pass through the hard disk back panel 330 to protrude from the corresponding position on the surface. As a result, the second hard disk interfaces 331 on the two opposite surfaces of the hard disk back panel 330 are interfered with each other, the second hard disk interfaces 331 on the two opposite surfaces of the hard disk back panel 330 cannot be disposed on the same corresponding position, and the second hard disk interfaces 331 can be disposed on the two opposite surfaces of the hard disk back panel 330 by a staggered arrangement method.

In addition, the connection interfaces of the second hard disks 332 and 332' used to connect to the second hard disk interfaces 331 are not set along center lines of side surfaces of the second hard disks 332 and 332' but are disposed on edges of the side surfaces of the second hard disks 332 and 332'. Therefore, when a user wants to set the second hard disks 332 and 332' from the front side, the second hard disks 332 and 332' are arranged to make the connection interfaces be under the center lines and connected to the corresponding second hard disk interfaces 331; on the contrary, the user arranges the second hard disks 332 and 332' to make the connection interfaces be above the center lines and connected to the corresponding second hard disk interfaces 331.

Accordingly, when the second hard disks 332 and 332' are electrically connected to the second hard disk interfaces 331 on the two opposite surfaces of the hard disk back panel 330 one on one, the second hard disks 332 are set on the obverse side, and the second hard disks 332' are set on the reverse side. The second hard disks 332 and 332' disposed on the two opposite surfaces of the hard disk back panel 330 are set in the reverse direction of 180 degrees, so that the second hard disks 332 and 332' can still be aligned and disposed on the two opposite surfaces of the hard disk back panel 330. Furthermore, the second hard disks 332 or 332' disposed on the two opposite surfaces of the hard disk back panel 330 are arranged in an array including at least two rows (such as a 2×6 array or a 2×4 array).

It is worthy of note that the storage array modules 300 of the present invention are not the motherboard modules 200, and the first hard disks 322 and the second hard disks 332 and 332' can be disposed in the different storage array modules 300 in the server device 10, such as shown in FIG. 1.

When a portion of or the entire first tray 310 is drawn from the chassis 100, the first hard disks 322 or the second hard disks 332 and 332' can be exposed from the chassis 100. Therefore, the user can plug or pull the first hard disks 322 or the second hard disks 332 and 332'.

Figure 4:
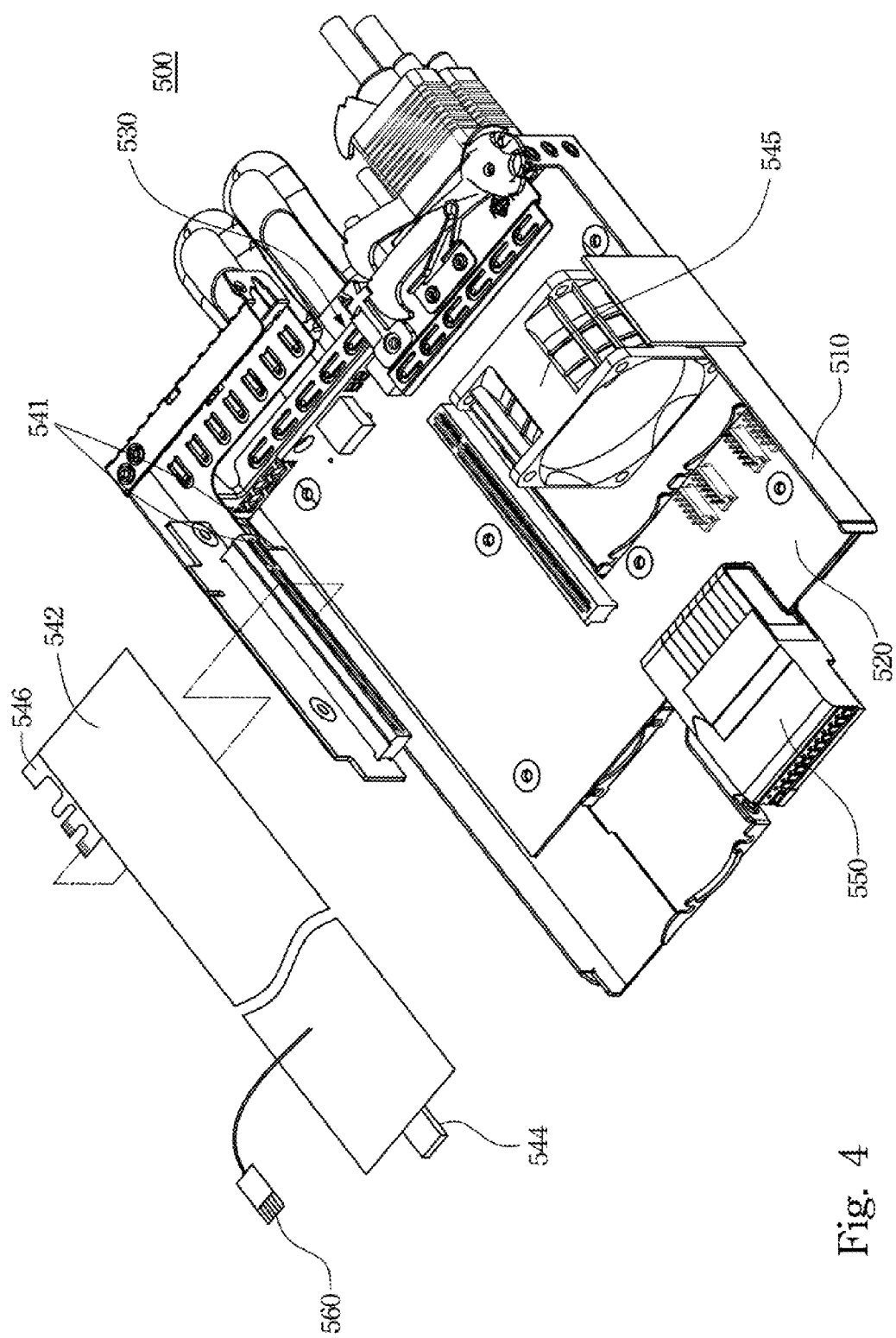
FIG. 4 is a three-dimensional drawing of an input/output interface circuit board module of a server device with a storage array module in accordance with one embodiment of the present invention.

Further refer to FIG. 1 and FIG. 4. FIG. 4 is a three-dimensional drawing of an input/output interface circuit board module of a server device with a storage array module in accordance with one embodiment of the present invention. The input/output interface circuit board modules 500 are disposed in the second rooms 106 on two sides of the carrier 130 one on one, and each of the input/output interface circuit board modules 500 corresponds to one storage array module 300 in the upper region 101 and one motherboard module 200 in the lower region 103. The configurations of the devices on the two adjacent input/output interface circuit board modules 500 are mirroring and symmetrical to each other relative to the carrier 130.

The input/output interface circuit board module 500 includes a third tray 510, an input/output interface circuit board 520, a connector interface 530 and a motherboard connector 550. The third tray 510 is set in the second room 106 (as shown in FIG. 1) and is removably drawn out or plugged into the second opening 105. The input/output interface circuit board 520 is horizontally adhered to the third tray 510. The connector interface 530 is disposed on an end of the input/output interface circuit board 520 and is exposed by the second opening 105 for being plugged in by various removable connectors. The motherboard connector 550 is disposed on the input/output interface circuit board 520 and is electrically connected to an input/output interface circuit board connector 270 of the corresponding motherboard module 200. The input/output interface circuit board 520 includes a plurality of external card input/output interfaces 541, and each of the external card input/output interfaces 541 can be plugged with an external card 242 (such as a PCI-E card or a PCI card). The external card 242 is plugged into the external card input/output interface 541 by using a gold finger interface 546 and is electrically connected to the input/output interface circuit board 520.

In addition, the external card 542 includes a storage array connector 560 (such as a mini-SAS interface) used to electrically connect the storage array module 300 and the input/output interface circuit board module 500, and to conduct and connect the motherboard module 200 and the storage array module 300 right above the motherboard module 200.

In the above-mentioned embodiment, the second opening 105 may include a double-layered space design (not shown) similar to the first opening 101. Therefore, the second opening 105 can provide four second rooms 106. That is to say that the second opening 105 can provide four rooms to contain four input/output interface circuit board modules 500, and every pair of input/output interface circuit board modules 500 are stacked with each other. The upper and lower input/output interface circuit board modules 500 are electrically connected to the motherboard module 200 corresponding to the lower region 103 commonly to provide the motherboard module 200 with more paths to connect with the external environment. The upper input/output interface circuit board modules 500 also can be electrically connected to the storage array module 300 via the external card 542.

With regard to the heat-dissipating design, the server device 10 includes a first cooling fan 544, a second cooling fan 142 and a third cooling fan 545. When one end of the external card 542 extends to one storage array module 300 in the upper region 102 of the chassis 100, the first cooling fan 544 is located on the end of the external card 542 extending toward the storage array module 300 to circulate the air between the storage array module 300 and the external card 542 to cool the storage array module 300 and the external card 542.

The second cooling fan 142 is located on the bottom surface of the chassis 100 and between the motherboards 220 and input/output interface circuit boards 520 to cool the motherboards 220 and the external card 542. The third cooling fan 545 is located on the third tray 510 and adjacent to the connector interface 530 to cool the input/output interface circuit board module 500.

Figure 5:
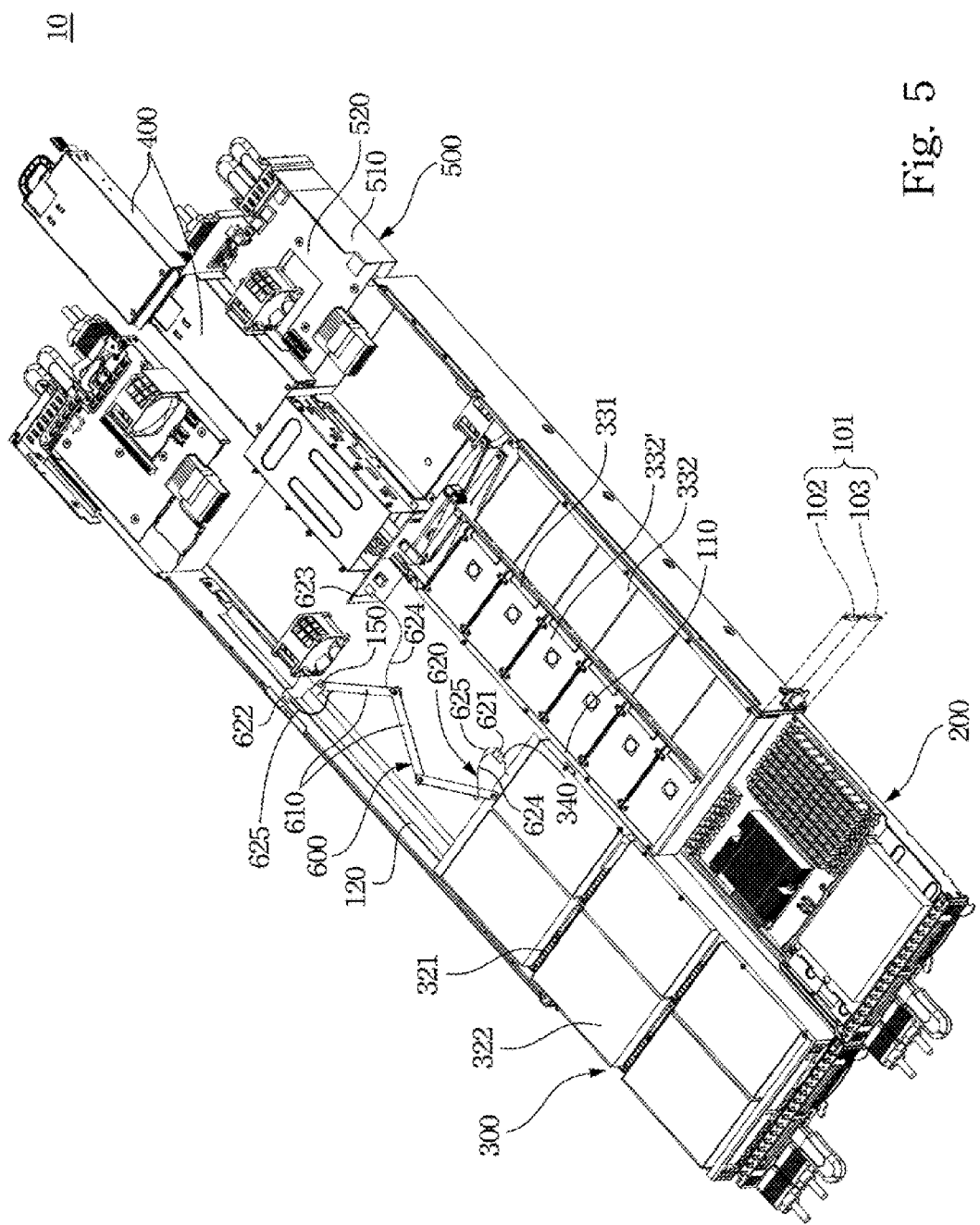
FIG. 5 is a schematic diagram showing a supporting arm of a server device with a storage array module in an extending state in accordance with one embodiment of the present invention.

When a portion of or the entire module of the conventional server chassis is drawn out, the electrical connection of the server chassis becomes disconnected. Refer to FIG. 1 and FIG. 5. FIG. 5 is a schematic diagram showing a supporting arm of a server device with a storage array module in an extending state in accordance with one embodiment of the present invention. An extendable/foldable supporting arm 600 is disposed between the chassis 100 and the storage array modules 300. The supporting arm 600 is composed of a plurality of link rods 610, wherein the link rods 610 are arranged in a series connection method and are pivotly connected in sequence. One end of the first link rod 610 of the supporting arm 600 is pivotly connected to the portion of the chassis 100 near the input/output interface circuit board module 500, such as a protruding-shelf 150 on an inner sidewall of the chassis 100 (such as shown in FIG. 1), and the other end of the first link rod 610 is pivotly connected to one end of another link rod 610. One end of the last link rod 610 of the supporting arm 600 is pivotly connected to the first tray 310 of the storage array module 300, and the other end of the last link rod 610 is pivotly connected to one end of another link rod 610.

When the first tray 310 is drawn out to drive the storage array module 300 to leave the first opening 101, the supporting arm 600 is expanded to increase the expanding distance of the supporting arm 600 by sequentially pivoting the link rods 610 (such as shown in FIG. 5). On the contrary, when the first tray 310 is pushed to drive the storage array module 300 to enter the first opening 101, the supporting arm 600 is folded to decrease the expanding distance of the supporting arm 600 by sequentially pivoting the link rods 610 (such as shown in FIG. 1), so as to achieve the object of reducing the occupying space.

The supporting arm 600 further includes a wire set 620 disposed on the supporting arm, and the wire set 620 extends from the input/output interface circuit board module 500 to the storage array module 300 as the moving of the link rods 610. The wire set 620 includes at least one power wire 624 and a signal wire 625. One end of the wire set 620 is electrically connected to a connector 340 on the hard disk back panel 320 or 330 of the storage array module 300 by a first connector 621 (for example, a mini-SAS interface including a power wire 624 and a signal wire 625), and the other end of the wire set 620 includes a second connector 622 having a signal wire 625 and a third connector 623 having a power wire 624. The second connector 622 is electrically connected to the storage array connector 560 (referring to FIG. 4). The third connector 623 is electrically connected to the connector of the power vertical panel 140.

Figure 6:
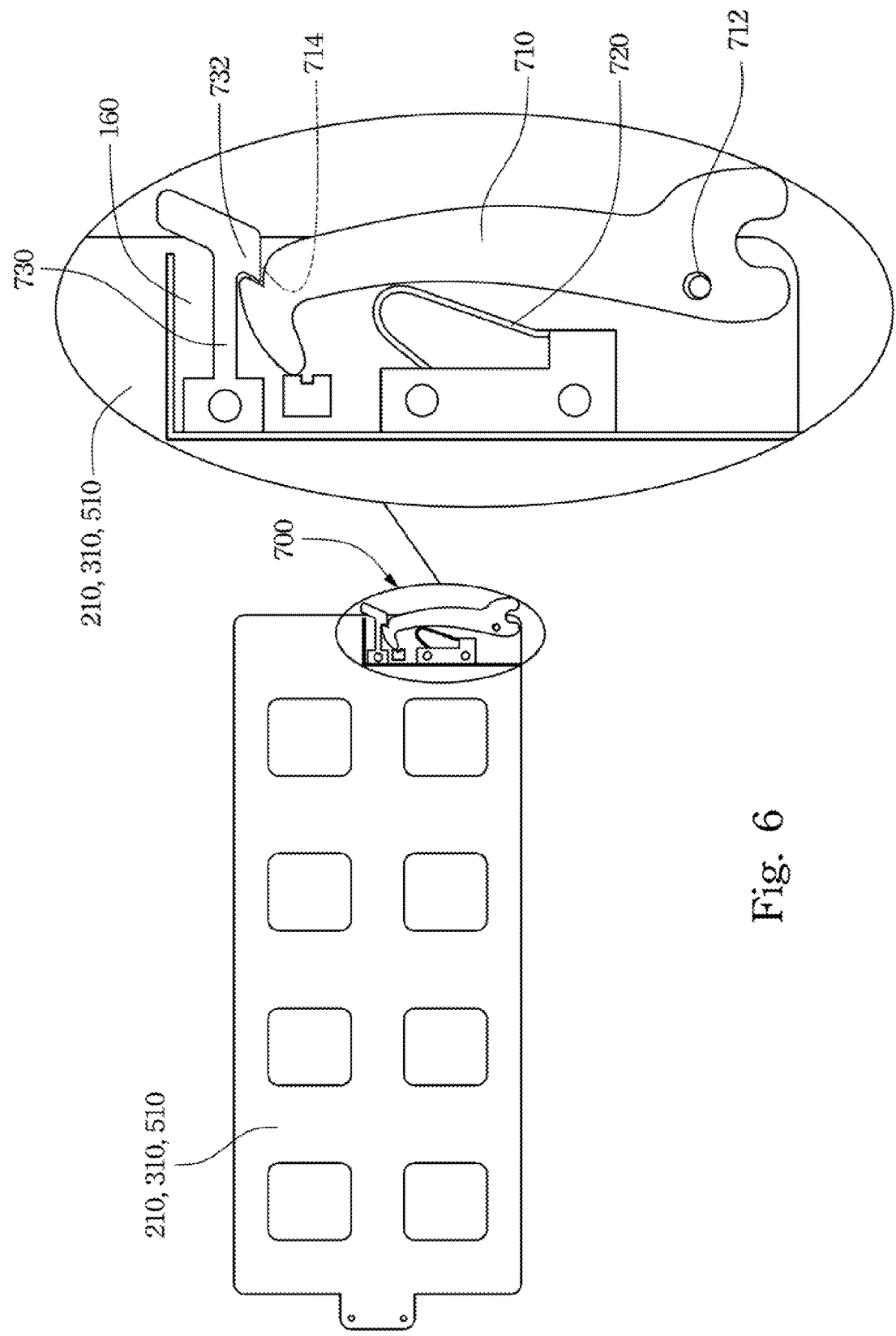
FIG. 6 is a schematic diagram showing a handle structure of a server device with a storage array module in an extending state in accordance with one embodiment of the present invention.

Refer to FIG. 6. FIG. 6 is a schematic diagram showing a handle structure of a server device with a storage array module in accordance with one embodiment of the present invention. According to the above-mentioned embodiments, the second tray 210, the first tray 310 and/or the third tray 510 can include a handle structure 700, which can be shut and turned. The handle structure 700 includes a handle rod 710, an elastic sheet 720 and a shaft 730. One end of the handle rod 710 is pivotly set in a receiving region 160 of the second tray 210, the first tray 310 or the third tray 510 by a pivot portion 712, wherein one end of the handle rod 710 far away from the pivot portion 712 includes a fixing cavity 714. One end of the elastic sheet 720 is fixed in the receiving region 160, and the other end of the elastic sheet 720 is a free end and obliquely extends toward the outer of the receiving region 160. One end of the shaft 730 is fixed on the second tray 210, the first tray 310 or the third tray 510, the other end of the shaft 730 is a free end, and a side of the other end of the shaft 730 facing the handle rod 710 is set with a fixing protrusion 732. When the handle rod 710 is turned into the receiving region 160 to push the elastic sheet 720, die fixing protrusion 732 is wedged in the fixing cavity 714 to limit the movement of the handle rod 710. On the contrary, when the other end of the shaft 730 is turned to make the fixing protrusion 732 leave the fixing cavity 714, the handle rod 710 is pushed out of the receiving region 160 by the pushed elastic sheet 720 and is exposed by the first opening 101 or the second opening 108 for the user to hold the handle rod 710 to push or pull the second tray 210, the first tray 310 or the third tray 510.

Each "vertical panel" described in the present specification refers to a panel which is disposed by standing the narrower surface of the panel on the chassis 100, the input/output interface circuit board 520 or the tray. A longer side surface or a shorter surface of the "vertical panel" may be adhered to a surface of the chassis 100, the input/output interface circuit board 520 or the tray according to the space or design, so that a side surface with a larger area of the panel can be provided for disposition or connection.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A server device with a storage array module, including:
   a chassis including:
      a first opening and a second opening on two opposite ends thereof, and the first opening is defined to include an upper region and a lower region; and
      a center partition vertical panel set in the first opening, and the upper region and the lower region in the first opening are divided into a plurality of first rooms by the center partition vertical panel;
   at least one motherboard module removably disposed in the lower region of the chassis, wherein each of the first rooms in the lower region contains one of the at least one motherboard module; and
   at least one storage array module removably disposed in the upper region of the chassis, wherein each of the first rooms in the upper region contains one of the at least one storage array module and the at least one storage array module including:
      a first tray removably disposed in the chassis, wherein the first tray can move out or into the chassis;
      a hard disk back panel fixed on a bottom of the first tray and electrically connected to the at least one motherboard module; and
      a plurality of hard disks hot-pluggably disposed in the first tray and electrically connected to the hard disk back panel, wherein when the first tray moves out the chassis, the hard disks are exposed.

2. The server device with a storage array module according to claim 1, wherein the hard disk back panel is horizontally disposed on the bottom of the first tray, and the hard disk back panel includes:
   a plurality of first hard disk interfaces spaced at intervals on a surface of the hard disk back panel and all facing the same direction,
   wherein the hard disks are horizontally disposed on the hard disk back panel and are electrically connected to the first hard disk interfaces one on one.

3. The server device with a storage array module according to claim 1, wherein the hard disk back panel is erected on the first tray, the hard disk back panel includes:
   a plurality of second hard disk interfaces staggered and disposed on two opposite surfaces of the hard disk back panel and electrically connected to the hard disks one on one,
   wherein the hard disks are aligned and disposed on two opposite surfaces of the hard disk back panel, and the hard disks are set in a reverse direction with 180 degrees.

4. The server device with a storage array module according to claim 3, wherein the hard disks disposed on each of the surfaces of the hard disk back panel are arranged in an array including at least two rows.

5. The server device with a storage array module according to claim 1, wherein the at least one motherboard module includes:
   a second tray removably disposed in one of the first rooms in the lower region; and
   a motherboard disposed on the second tray.

6. The server device with a storage array module according to claim 5, wherein the second tray includes a handle structure, the handle structure can be shut and turned, and the handle structure includes:
   a handle rod, wherein one end of the handle rod is pivotly set in a receiving region of the second tray, and the other end of the handle rod includes a fixing cavity;
   an elastic sheet, wherein one end of the elastic sheet is fixed in the receiving region, and the other end of the elastic sheet is a free end and obliquely extends toward the outer of the receiving region; and
   a shaft, wherein one end of the shaft is fixed on the second tray, the other end of the shaft is a free end, and a side of the other end of the shaft facing the handle rod is set with a fixing protrusion,
   wherein when the handle rod is turned into the receiving region to push the elastic sheet, the fixing protrusion is wedged in the fixing cavity, and
   when the fixing protrusion leaves the fixing cavity, the handle rod is pushed out of the receiving region by the pushed elastic sheet and is exposed by the first opening or the second opening.

7. The server device with a storage array module according to claim 1, further including:
   a carrier disposed in the second opening to divide the second opening into a plurality of second rooms; and
   a plurality of removable power modules stacked with each other in the carrier.

8. The server device with a storage array module according to claim 7, wherein the chassis includes a power vertical panel between the carrier and center partition vertical panel, and two opposite surfaces of the power vertical panel are electrically connected to the removable power modules and the at least one motherboard module respectively.

9. The server device with a storage array module according to claim 7, further including a plurality of removable input/output interface circuit board modules respectively disposed in the second rooms and electrically connected to the at least one motherboard module, wherein each of the removable input/output interface circuit board modules includes:
   a third tray removably disposed in one of the second rooms;
   an input/output interface circuit board disposed on the third tray and electrically connected to the motherboard of the at least one motherboard module; and a plurality of external card input/output interfaces electrically connected to the input/output interface circuit board and plugged with an external card.

10. The server device with a storage array module according to claim 9, wherein one end of the external card extends to the at least one storage array module in the upper region, and a first cooling fan is disposed on the end of the external card.

11. The server device with a storage array module according to claim 9, wherein the chassis further includes:

an extendable/foldable supporting arm composed of a plurality of link rods, wherein the link rods are arranged in a series connection method and are pivotly connected in sequence, and two ends of the extendable/foldable supporting arm are pivotly connected to the chassis and the at least one storage array module respectively; and a wire set disposed on the extendable/foldable supporting arm and extending/folding as the moving of the extendable/foldable supporting arm, wherein one end of the wire set is electrically connected to the at least one storage array module pivotly connected to the extendable/foldable supporting arm, and the other end of the wire set is at least electrically connected to one of the removable input/output interface circuit board modules.

12. The server device with a storage array module according to claim 9, wherein the third tray includes a handle structure, the handle structure can be shut and turned, and the handle structure includes:

a handle rod, wherein one end of the handle rod is pivotly set in a receiving region of the third tray, and the other end of the handle rod includes a fixing cavity;

an elastic sheet, wherein one end of the elastic sheet is fixed in the receiving region, and the other end of the elastic sheet is a free end and obliquely extends toward the outer of the receiving region; and a shaft, wherein one end of the shaft is fixed on the third tray, the other end of the shaft is a free end, and a side of the other end of the shaft facing the handle rod is set with a fixing protrusion, wherein when the handle rod is turned into the receiving region to push the elastic sheet, the fixing protrusion is wedged in the fixing cavity, and when the fixing protrusion leaves the fixing cavity, the handle rod is pushed out of the receiving region by the pushed elastic sheet and is exposed by the first opening or the second opening.

13. The server device with a storage array module according to claim 7, wherein the second opening is defined to include an upper region and a lower region.

14. The server device with a storage array module according to claim 1, wherein the first tray, includes a handle structure, the handle structure can be shut and turned, and the handle structure includes:

a handle rod, wherein one end of the handle rod is pivotly set in a receiving region of the first tray, and the other end of the handle rod includes a fixing cavity;

an elastic sheet, wherein one end of the elastic sheet is fixed in the receiving region, and the other end of the elastic sheet is a free end and obliquely extends toward the outer of the receiving region; and a shaft, wherein one end of the shaft is fixed on the first tray, the other end of the shaft is a free end, and a side of the other end of the shaft facing the handle rod is set with a fixing protrusion, wherein when the handle rod is turned into the receiving region to push the elastic sheet, the fixing protrusion is wedged in the fixing cavity, and when the fixing protrusion leaves the fixing cavity, the handle rod is pushed out of the receiving region by the pushed elastic sheet and is exposed by the first opening or the second opening.

* * * * *